United States Patent [19]
Chang et al.

[11] Patent Number: 5,744,780
[45] Date of Patent: Apr. 28, 1998

[54] APPARATUS FOR PRECISION MICROMACHINING WITH LASERS

[75] Inventors: Jim J. Chang, Dublin; Ernest P. Dragon, Danville; Bruce E. Warner, Pleasanton, all of Calif.

[73] Assignee: The United States of America as represented by the United States Department of Energy, Washington, D.C.

[21] Appl. No.: 523,321

[22] Filed: Sep. 5, 1995

[51] Int. Cl.$^6$ .................................................. B23K 26/18
[52] U.S. Cl. .............................. 219/121.73; 219/121.68; 219/121.74
[58] Field of Search .................... 219/121.68, 121.69, 219/121.7, 121.71, 121.74, 121.8, 121.78; 359/224, 225

[56] References Cited

U.S. PATENT DOCUMENTS

| | | | |
|---|---|---|---|
| 4,286,212 | 8/1981 | Staebler et al. | 359/221 |
| 4,910,378 | 3/1990 | Arai | 219/121.74 |
| 4,917,484 | 4/1990 | Heinz | 359/224 |
| 4,945,206 | 7/1990 | Arai | 219/121.74 |
| 5,235,263 | 8/1993 | Boston et al. | 219/121.6 |
| 5,289,557 | 2/1994 | Sheinis et al. | 385/119 |
| 5,334,816 | 8/1994 | Sugiyama | 219/121.84 |
| 5,371,570 | 12/1994 | Morris et al. | 359/565 |
| 5,434,882 | 7/1995 | Chang | 372/92 |
| 5,493,096 | 2/1996 | Koh | 219/121.71 |

OTHER PUBLICATIONS

Product Literature for "Optics for Research–Precision Optical Components", 2 pages No Publication Date.
J.J. Chang, et al., "Precision Micro Drilling With Copper Vapor Lasers," Icaleo (Oct. 1994), pp. 323–332.
Company Literature for Physik Instrumente No Publication Date (PI), "S–320 Tilting Mirror," 3 pages.
J.J. Chang, "Copper–Laser Oscillator With Ajoint–Coupled Self–Filtering Injection," reprinted form Optics Letters, vol. 20, No. 6 (Mar. 15, 1995), pp. 575–577.
Kupfer et al., Material Influence on Cutting and Drilling of Metals using Copper Vapour Lasers (1991) SPIE vol. 1598, pp. 46–60.
Chang, Pressure dependence of copper laser output characteristics, (1993) Applied Optics, vol. 32, No. 27, pp. 5230–5235.
van Krieken et al., Laser Micro Machining of material surfaces, (1988), SPIE, vol. 1022, pp. 34–37.
Treusch et al., Metal Precision Drilling with Lasers, (1986) SPIE vol. 650, pp. 220–225.
Zemskov et al., "Soviet Journal of Quantum Electronics, vol. 14, No. 2, Feb. 1984, " Laser Machining of Objects With Simultaneous Visual Monitoring in a Copper Vapor Oscillator–Amplifier System, pp. 288–290.
Hargrove et al., Laser Materials Processing Applications at Lawrence Livermore National Laboratory, Proceedings of the SPIE—The International Society for Optical Engineering, vol. 1859, pp. 263–272, jan. 1993.

*Primary Examiner*—Geoffrey S. Evans

[57] ABSTRACT

A new material processing apparatus using a short-pulsed, high-repetition-rate visible laser for precision micromachining utilizes a near diffraction limited laser, a high-speed precision two-axis tilt-mirror for steering the laser beam, an optical system for either focusing or imaging the laser beam on the part, and a part holder that may consist of a cover plate and a back plate. The system is generally useful for precision drilling, cutting, milling and polishing of metals and ceramics, and has broad application in manufacturing precision components. Precision machining has been demonstrated through percussion drilling and trepanning using this system. With a 30 W copper vapor laser running at multi-kHz pulse repetition frequency, straight parallel holes with size varying from 500 microns to less than 25 microns and with aspect ratios up to 1:40 have been consistently drilled with good surface finish on a variety of metals. Micromilling and microdrilling on ceramics using a 250 W copper vapor laser have also been demonstrated with good results. Materialogroaphic sections of machined parts show little (submicron scale) recast layer and heat affected zone.

13 Claims, 1 Drawing Sheet

APPARATUS FOR PRECISION MICROMACHINING WITH LASERS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to laser material processing, and more specifically, it relates to precision micromachining with lasers.

2. Description of Related Art

Laser machining has found expanded use in automobile, aerospace, and electronics industries. For example, lasers are used in sheet metal cutting, drilling, and milling. In microelectronics, lasers are employed to scribe wafers, trim passive film elements, and obtain alloy p-n junctions of semiconductors. The advancements of laser machining are mainly due to the possibility of making small and unique structures that are difficult to achieve with conventional methods, and its applicability to traditionally hard-to-work materials such as ceramics, glass, and composite materials. Despite the advantages of laser machining, to date the introduction of precision laser micromachining to industry has been slowed by the lack of a well designed system that consists of an advanced high-beam-quality high-power laser, a precision beam control system, and suitable target holding mechanisms.

Laser drilling has been widely used in industry because of its high production rate, capacity for rapidly varying hole size, for drilling holes at shallow angles, and for drilling traditionally hard-to-work materials such as ceramics and composite materials. However, material removal based on conventional $CO_2$ or YAG lasers is mostly through melt expulsion that normally leads to poor dimensional control and a sizable recast layer with microcracks on the sidewall of holes. The strong plasma-beam interaction at infrared (IR) wavelengths also makes the material removal during laser drilling less controllable. The reduced ability to focus the infrared laser beam makes it more difficult to produce micron-scale holes with large hole aspect ratio (i.e., hole depth to diameter).

Conventional laser machining using high-power $CO_2$ and YAG laser systems are typically characterized by rough machining kerf, existence of recast layer and large heat affected zone, and relatively large feature size. As a result, these systems are seldom used in precision micro machining. These issues have prevented the advancement of high-quality precision laser micromachining. A more sophisticated laser system and processing control is thus required for the advancement of laser precision machining. Accordingly, it is desirable that the laser have near-diffraction limited beam quality. To reduce the recast layer and heat affect zone in the material, it is desirable that the laser have a short pulse duration (<1 µs) with high peak power (greater than 100 $MW/cm^2$). To minimize the deleterious effects of a laser produced plasma on material and to improve laser energy coupling to the material, the laser wavelength should be in the visible range. To ensure high speed production, the laser should be capable of running at high repetition frequency (i.e., at least several kHz). In addition, a precision beam steering system is highly desirable for accurate control of machined feature size and shape. Material preparation in the part holder is also important in terms of machining quality. The desirable characteristics discussed supra are provided by the present invention and are not available in prior art micromachining systems.

SUMMARY OF THE INVENTION

It is an object of the present invention to provide an apparatus using a laser for precision micromachining.

It is also an object of the invention to reduce the recast layer and heat affected zone in the micromachined material by providing a laser having a short pulse duration, high peak power, and rapid beam movement.

Another object of the invention is to minimize the deleterious effects of a laser produced plasma on the micromachined material by providing a visible wavelength laser.

Still another object of the invention is to facilitate high speed production by providing a laser that is capable of running at high repetition frequencies.

A further object of the invention is to provide a precision beam steering system for accurate control of machined feature size and shape.

Another object of the invention is to provide material preparation in the part holder to improve machining quality.

A high-beam-quality, short pulsed, high-repetition-rate, visible laser can produce a micron scale laser spot size which is 20 times smaller than the spot size generated by a conventional $CO_2$ laser. The laser of the present invention, combined with a high speed precision tilting mirror and a beam shaping optical system, can precisely deposit a large amount of energy onto a micron scale area of the machining parts for material removal and modification. To reduce the size of the kerf, the part holder may consist of a thin cover plate that makes intimate contact with the part and shields it from stray light. A back plate may also be used to improve the quality of the exit kerf.

A near-diffraction-limited laser is required for the production of a well defined small laser spot on the material for micron scale machining control. Material removal is achieved mostly through laser ablation with little recast layer formation by using a short laser pulse output with high peak power. A high repetition frequency (multi-kHz) laser output enables its use in high speed machining. A visible wavelength copper laser has negligible surface plasma absorption as compared to IR or UV lasers. This characteristic leads to better energy coupling between laser light and material, and smaller undesired plasma heating on the material.

A precision x-y tilt mirror is used to scan the laser spot on the material that defines the machined feature size and shape. To perform precision laser machining, the size of the laser beam on the parts needs to be reduced to micron scale. This can be accomplished by using high quality focusing optics such as lenses or curved mirrors. To increase the machining speed and to improve the machining quality, a gas may be applied through a nozzle. An optional thin cover plate may be applied on the part surface facing the laser beam. This thin cover plate (e.g., a foil) serves to collect vapor deposits from the machining process and acts as a surrogate surface to intercept stray light for the optical system. A back plate covering the other side of the part may also be used to improve machining quality in penetration drilling or cutting.

BRIEF DESCRIPTION OF THE DRAWINGS

The single FIGURE shows an embodiment of the laser micromachining system of the present invention.

DETAILED DESCRIPTION OF THE INVENTION

Figure 1:
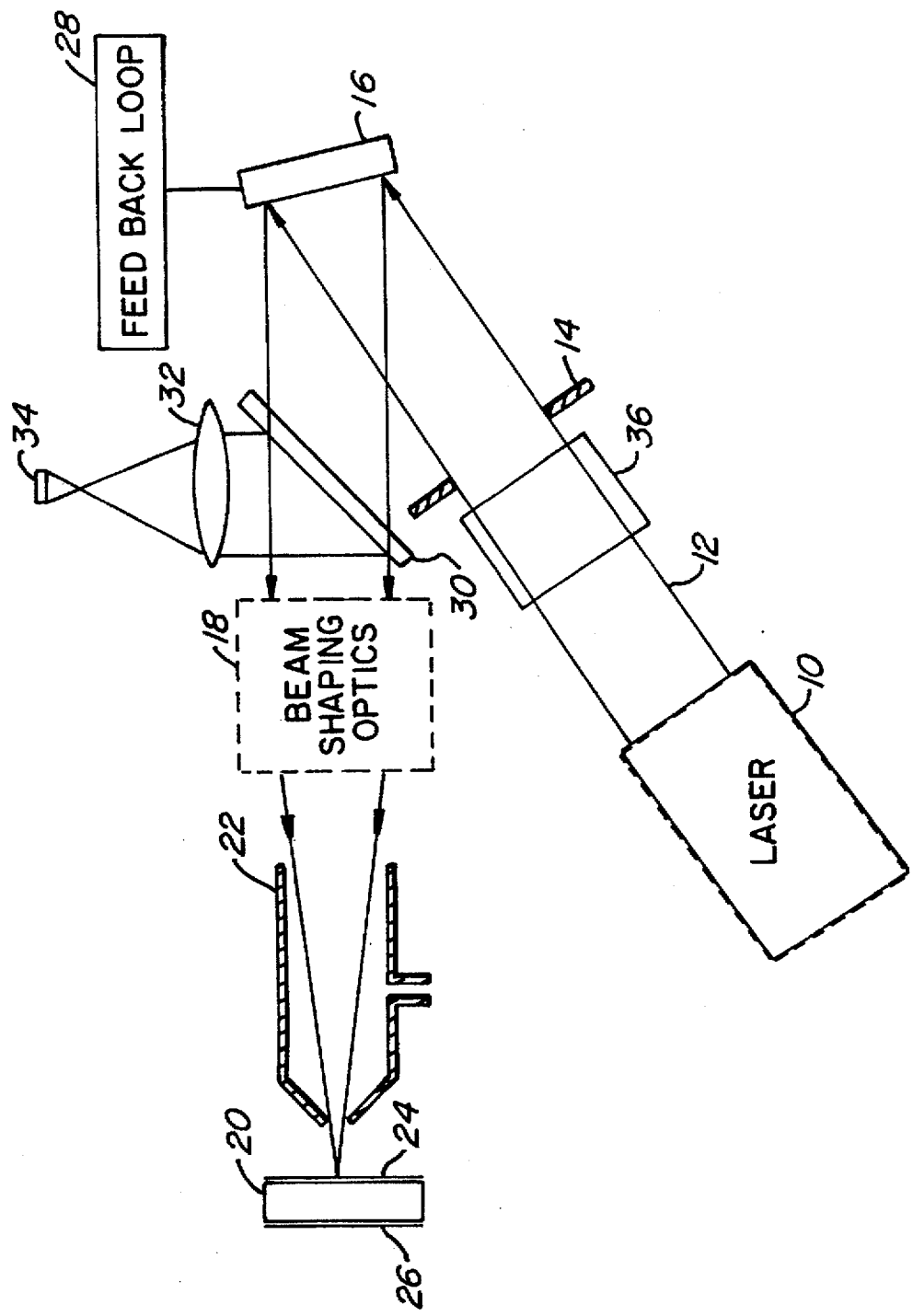

The invention is a new laser micromachining technique based on near-diffraction-limited laser systems, a precision wavefront tilting technology, and a special part preparation method. High aspect ratio straight holes characterized by smooth side wall with negligible recast layer have been consistently produced. The use of a precision-wavefront-tilting technology greatly reduces the hole size and roundness error, typically to less than a few microns. Micromachining and microdrilling on a variety of ceramics have also been demonstrated with excellent results.

The single FIGURE shows an embodiment of the laser precision micromachining system of the present invention. Laser 10 produces an output laser beam 12 which may be apertured by aperture 14. The apertured beam is then reflected from a precision tilting mirror 16. Precision tilting mirror 16 directs output laser beam 12 toward beam shaping optics 18 which focuses the laser beam 12 onto part 20. Gas nozzle 22 may assist the machining process as discussed infra. A front cover plate 24 and/or a back cover plate 26 may also be used.

High-beam-quality laser 10 (better than 2 times the diffraction limit is desired) is an essential part of this machining technique. The near-diffraction-limited laser output beam 12 enables the generation of a well defined small laser spot on the material (part 20) for micron scale machining control. Its short laser pulse output with high peak power ensures the material removal mostly through laser ablation with little recast layer formation. Its high repetition frequency (multi-kHz) laser output enables its use in high speed machining. A visible wavelength copper laser (511 nm and 578 nm) has negligible surface plasma absorption as compared to IR and ultraviolet (UV) lasers. This characteristic leads to better coupling between laser light and material, and smaller undesired plasma heating on the material. Laser 10 may be a copper vapor laser or a frequency doubled ND:YAG laser having the above characteristics.

Precision x-y tilt mirror 16 is used to scan the laser spot on the material that defines the machined feature size and shape. The mirror should have voltage controlled x and y axis drives that are capable of microradian tilt control at 1 to 1000 Hz. When combined with appropriate beam shaping optics, the tilt in the beam propagation direction translates into a position change on the part to be machined. Complicated machining patterns can be achieved by designing the waveforms and amplitudes that drive the tilts of both x and y axes of the mirror. For example, two sinusoidal voltage signals of equal amplitude and 90 degree phase delay between the x and y axis will machine a circular cylinder. To improve its scanning precision, a servo feedback loop that compensates the hysteresis of the mirror tilt is used.

To perform precision laser machining, the size of the laser beam on the part 20 needs to be reduced to micron scale. This can be accomplished by using high quality focusing optics (beam shaping optic 18) such as lenses or curved mirrors. When a laser spot with a well defined pattern is required on part 20, a lens or mirror system that images an apertured laser beam to the part can be used. The shape of the aperture of the beam forming optics 18 is only limited by the specific application. Beam shaping optics 18 may be a single lens or a series of lenses or curved mirrors. In each case, it is preferable that the system has diffraction limited performance over its aperture so that laser beam propagation angle tilts are faithfully reproduced as position changes in the focal or image planes, at the part.

To increase the machining speed and to improve the machining quality, a gas may be applied through gas nozzle 22. Assist gas was not found to be essential in CVL microdrilling, but there is evidence that oxygen and other gases increase drilling speed because of exothermic reactions. A variety of gases such as oxygen, nitrogen and inert gases, etc. can be used based on the material to be machined or the application.

Machining quality is improved and post processing cleaning is eliminated through the use of an optional thin cover plate 24 applied on the part surface facing the laser beam. This thin cover plate 24 (e.g., a foil) serves to collect vapor deposits from the machining process and acts as a surrogate surface to intercept stray light for the optical system. A back plate 26 covering the other side of the part may also be used to improve machining quality in penetration drilling or cutting. In practice this back plate 26 tends to improve the reproducibility of the machined part exit by extending the end effects of the cut into the back plate. In each case, the cover plate and back plate are discarded (and recycled) after use.

Using an injection-controlled copper vapor laser oscillator with near-diffraction-limited beam quality as laser 10 in the single FIGURE has shown that ~73% of the laser output is within diffraction-limited beam divergence. The CVL beam quality is thus approximately 1.1 times the diffraction limit based on the Strehl ratio. The laser may be designed to be operated between 4 and 9 kHz for various material processing requirements. This laser generates an output of about 30 W at wavelengths of 511 nm (60%) and 578 nm (40%). The self-terminated CVL used in this system typically has a pulse duration of 50–70 ns. For applications requiring higher laser power, the near diffraction-limited oscillator beam may be amplified to ~250 W through an optional CVL amplifier 36, as shown in the single FIGURE.

For micromachining applications, the laser beam 12 is focused by a high-quality achromat (in beam shaping optics 18) onto the workpiece, thus generating a diffraction-limited spot size. The precision two-axis scanning mirror 16 tilts the laser wavefront (before the wavefront passes through the achromat) with an angular resolution better than a few microradians. As discussed above, scanning mirror 16 may be equipped with a feedback loop 28 to compensate for hysteresis effects. The beam scanning frequency on the workpiece can be varied from 1 Hz to higher than 100 Hz depending on the application requirements. Beamsplitter 30 can reflect light through optic 32 so that a camera 34 may be used to examine the progress of material removal on the workpiece based on backscattered laser light.

In CVL percussion drilling, a stationary laser beam is used to drill through a stationary workpiece. Straight parallel holes with aspect ratios better than 40:1 have been repeatedly produced in a variety of steels. Because material removal in this case was mainly through laser ablation, these holes show no measurable heat affected zone and the hole quality is distinctively superior to those drilled with long pulse $CO_2$ and ND:YAG lasers. Smaller hole sizes can also be achieved using lower laser power and faster focusing optics, but this also reduces material penetration with the possibility of generating tapered holes. Since the coupling between the sidewall of a drilled hole and the laser beam is very poor due to high incidence angle, the laser peak power on the hole entrance must be more than a few $GW/cm^2$ to avoid hole taper.

Although straight holes free of recast layer can be produced by a simple CVL percussion drilling at a fairly fast speed, the hole dimensional control and hole repeatability are generally not satisfactory for high precision applications. Typically a tolerance of hole size and roundness of approximately 5–10% of its diameter is expected. Higher precision microdrilling must be accomplished by laser trepanning. Laser trepanning has been applied in industry to either improve the hole accuracy or to generate large holes, mostly for hole aspect ratios (depth to diameter) less than 1:1. Precision microtrepanning for high-aspect-ratio holes has rarely been accomplished because of difficulties in material penetration and removal. In the present invention, laser trepanning is achieved by periodically tilting the X-Y scanning mirror such that the laser spot generates a circular pattern on the workpiece, and trepanned holes with hole aspect ratio greater than 10:1 have been demonstrated. The holes on both sides demonstrate an extremely well defined circular pattern without erosion.

Repeatability of hole dimension has been significantly improved with the present invention. The variations of hole size and shape were almost impossible to measure based on the microscope measuring system. This striking improvement on hole repeatability is believed to be mainly due to the fact that laser trepanning with the present invention not only performs material removal during the initial drilling phase, but also engages in material trimming and sidewall polishing during the later drilling phase due to high laser repetition rate and high beam scanning frequency. Detailed examination of the hole section revealed that the recast layer and heat-affected zone were minimized to a non measurable level (i.e., sub micron-scale).

In addition to circular holes, trepanning non-circular holes with various geometries on a 1 mm thick piece of stainless steel has been demonstrated. These holes were cut by modifying the scanning pattern of the trepanning system to draw the desired shape on the target. Hole aspect ratios higher than 10:1 with no taper have been achieved with these non-circular trepanned holes. This demonstration of non-circular microholes with high aspect ratios reveals the great potential of the present invention in laser micromachining applications, and may have significant impact on engineering designs traditionally limited to circular holes.

Advanced fine ceramics have many excellent physical and chemical properties for use in high-density electronics fabrication and packaging; however, their hardness and brittleness make them difficult to machine even with diamond tools. The noncontact nature of laser micromachining precludes the problem of tool wear and also minimizes any unacceptable microstructure change. The laser machining methods using conventional $CO_2$ and YAG lasers have a disadvantage of developing thermal-stress induced cracks on ceramics. The use of high-radiance short-pulse CVL minimizes the material bulk heating such that crack-free micromachining processing becomes feasible.

Grooves have been laser milled (with about 40 W from a CVL) on a piece of silicon carbide (i.e., 1.25 mm thick) at 120 micrometers wide and 120 micrometers deep in a machined part. Detailed examination of the grooves showed straight sidewalls and a fairly flat bottom. The holes in the part were trepanned with 70 W from a CVL. The hole diameters in the part were 1.25 and 2.5 mm. The hole roundness was perfect and no material crack was observed. Micromachining on alumina and silicon nitride has also been demonstrated with promising results. This crack-free machining of a variety of ceramics represents a great potential for using the CVL based micromachining system of the present invention in the electronics industry.

Despite the advantages of laser micromachining over conventional methods, its advancement has been thwarted by the laggard development of advanced lasers suitable for this application. Thus, to meet the stringent precision requirement, the laser must have near-diffraction-limited beam quality with its wavelength in the visible range such that a circular laser focal spot with micron-scale size can be produced on the material's surface. To minimize the effects of material bulk heating and to produce a machined surface free of heat affected zones, the laser must have a relatively high peak power (greater than $10^8$ W/cm$^2$) and short pulse duration (i.e., sub-microsecond) such that the material removal is mainly through laser ablation instead of melting. Additionally, multi-kHz laser operation is preferred to remove the material in a more controllable fashion, such that the material removed during each pulse is small while the processing speed is maintained because of high pulse rate.

The CVL micromachining system of the present invention has great potential in the precision microfabrication industry. Its machining capability in ceramics surpasses not only conventional diamond tools but also $CO_2$ and YAG laser machining systems because of crack-free machining. The quality of micro-trepanned holes on metals using this system is found to be comparable or better than that done by electrical discharge machining (EDM). With the flexibility in hole geometry and size, and scalability to higher production speed, this micromachining system offers a technique superior to EDM machines that are currently widely used in industry.

Changes and modifications in the specifically described embodiments can be carried out without departing from the scope of the invention, which is intended to be limited by the scope of the appended claims.

We claim:

1. An apparatus for precision micromachining a part, comprising:

a laser beam produced by a laser, wherein said laser beam has a beam quality better than 2 times the diffraction limit, a pulse length less than 1 microsecond, a repetition rate greater than 2 kHz and a wavelength that is in the visible range;

a cover plate attached to a front surface of said pars., said cover plate collecting vapor deposits during said precision micromachining, wherein said cover plate is comprised of a foil;

an x-y tilt mirror to direct and scan said laser beam onto said covered part, wherein said x-y tilt mirror comprises voltage controlled x and y axis drives that are capable of microradian tilt control at 1 to 1000 Hz; and beam shaping optics to reduce the size of said laser beam to the micron scale, wherein said beam shaping optics are diffraction limited over their aperture.

2. The apparatus of claim 1, further comprising an assist gas nozzle located between said beam shaping optics and said covered part.

3. The apparatus of claim 2, further comprising within said assist gas nozzle a gas selected from a group consisting of oxygen and nitrogen.

4. The apparatus of claim 2, further comprising within said assist gas nozzle an inert gas.

5. The apparatus of claim 1, further comprising a beamsplitter positioned between said beam shaping optics and said x-y tilt mirror, said beamsplitter configured to reflect an image from said part, said apparatus further comprising a focusing optic to focus said image from said part onto a diagnostic camera.

6. The apparatus of claim 1, further comprising a servo-feedback loop connected to said x-y- tilt mirror to improve the scanning precision of said x-y tilt mirror by compensating for its hysteresis.

7. The apparatus of claim 1, wherein said laser comprises a visible wavelength copper vapor laser.

8. The apparatus of claim 7, wherein said laser beam has a wavelength selected from a group consisting of 511 nm and 578 nm.

9. The apparatus of claim 1, wherein said laser is selected from a group consisting of copper vapor laser and a frequency doubled ND:YAG laser.

10. The apparatus of claim 1, wherein said beam shaping optics comprise an achromat.

11. The apparatus of claim 1, further comprising a back surface cover plate attached to a back surface of said part.

12. The apparatus of claim 1, further comprising an amplifier to amplify said laser beam.

13. The apparatus of claim 12, wherein said amplifier is selected from a group consisting of a copper vapor laser amplifier and a ND:YAG amplifier.

* * * * *